United States Patent
Przydatek et al.

(10) Patent No.: US 6,611,773 B2
(45) Date of Patent: Aug. 26, 2003

(54) APPARATUS AND METHOD FOR MEASURING AND REPORTING THE RELIABILITY OF A POWER DISTRIBUTION SYSTEM WITH IMPROVED ACCURACY

(75) Inventors: Piotr B. Przydatek, British Columbia (CA); Bradford J. Forth, Victoria (CA); Michael E. Teachman, Victoria (CA); Jeffrey W. Yeo, Saanichton (CA)

(73) Assignee: Power Measurement Ltd. (CA)

(*) Notice: Subject to any disclaimer, the term of this patent is extended or adjusted under 35 U.S.C. 154(b) by 103 days.

(21) Appl. No.: 09/749,129

(22) Filed: Dec. 27, 2000

(65) Prior Publication Data

US 2002/0116139 A1 Aug. 22, 2002

Related U.S. Application Data

(63) Continuation-in-part of application No. 09/724,309, filed on Nov. 28, 2000.

(51) Int. Cl.7 ............................................. G06F 19/00
(52) U.S. Cl. ....................................................... 702/62
(58) Field of Search ..................... 702/62, 61; 340/310; 356/229; 381/107; 600/455; 367/88; 351/221; 354/483, 492; 713/202; 707/6

(56) References Cited

U.S. PATENT DOCUMENTS

| | | | |
|---|---|---|---|
| 5,627,759 A | 5/1997 | Bearden et al. ............. | 364/483 |
| 5,650,936 A | 7/1997 | Loucks et al. .............. | 364/483 |
| 5,684,710 A | 11/1997 | Ehlers et al. ................ | 364/492 |
| 5,825,656 A | 10/1998 | Moore et al. ................ | 364/483 |
| 5,899,960 A | 5/1999 | Moore et al. ................. | 702/60 |
| 5,946,086 A * | 8/1999 | Bruce ......................... | 356/229 |
| 6,360,178 B1 * | 3/2002 | Parsons et al. ........ | 340/310.01 |
| 6,374,188 B1 | 4/2002 | Hubbard et al. .............. | 702/61 |
| 6,411,910 B1 | 6/2002 | Eulau et al. ................. | 702/60 |

OTHER PUBLICATIONS

Xu et al., "Development of Prototype Custom Power Devices for Power Quality Enhancement", IEEE, 2000.
Crozier et al., "A Power Quality and Reliability Index Based on Customer Interruption Costs", IEEE, 1999.
Parihar et al., "Identification, Classification and Correlation of Monitored Power Quality Events", IEEE, 1998.
Nagaraju et al., "Networked Electronic Energy Meters with Power Quality Analysis", IEEE, date unknown.
Saari et al., "Remote Reading and Data Management System for kWh Meters with Power Quality Monitoring", IEEE, 1996.
Electrotek Concepts™ "EPRI Reliability Benchmarking Methodology" brochure, obtained at internet address http://www.electrotek.com/projects/rbm.htm pp. 1–3, on Jun. 1, 2001.
PQView® "Power Quality Database Management and Analysis Software System" brochure, obtained at internet address http://www.pqview.com/ pp. 1–8, on Jun. 1, 2001.
Electric Power Group "Competitive Electricity Markets—Customer Needs and Power Technology," presentation Feb., 2001, obtained at internet address http://www.electricpowergroup.com/pres/XENERGY_Presentation_2–13–01.pdf pp. 1–16.
Peace Software White Paper "Making e–business Work in Energy Retailing," obtained at internet address http://www.peace.com/public/pdfs/Peace%20Making%20eBusiness%20Work.pdf pp. 1–12, on Jun. 1, 2001.
"IEEE Trial–Use Guide for Electric Power Distribution Reliability Indices", The Institute of Electrical and Electronics Engineers, Inc., copyright© 1999 pp. 1–16.

* cited by examiner

*Primary Examiner*—John Barlow
*Assistant Examiner*—Tung S Lau
(74) *Attorney, Agent, or Firm*—Brinks Hofer Gilson & Lione

(57) ABSTRACT

An intelligent electronic device for measuring various power parameters from a electrical power distribution system is disclosed. The device is capable of measuring and reporting the reliability of the electrical power distribution system as the number of consecutive 9's digits appearing in the computed percentage of system downtime versus system uptime. The number of 9's is computed in a manner which does not incur inaccuracies at high resolutions due to digital floating point mathematical computation methods.

31 Claims, 5 Drawing Sheets

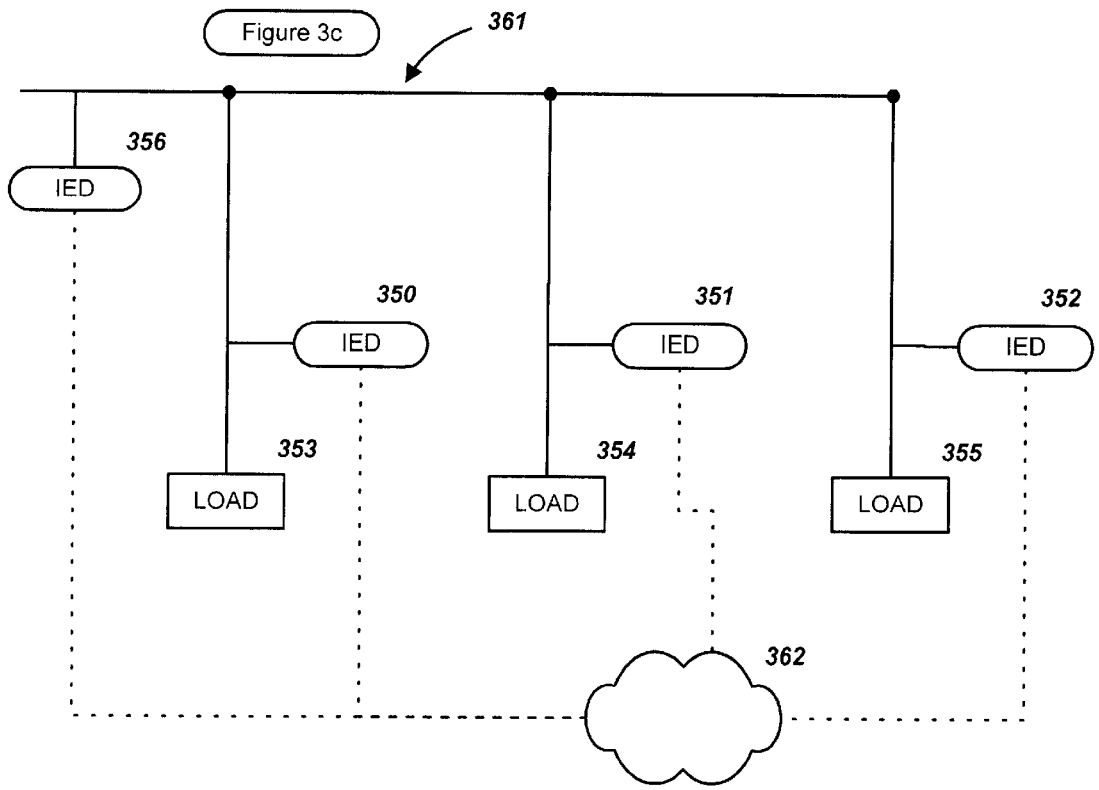

APPARATUS AND METHOD FOR MEASURING AND REPORTING THE RELIABILITY OF A POWER DISTRIBUTION SYSTEM WITH IMPROVED ACCURACY

RELATED APPLICATIONS

This application is a continuation-in-part under 37 C.F.R. §1.53(b) of U.S. Pat. application Ser. No. 09/724,309, entitled "APPARATUS AND METHOD FOR MEASURING AND REPORTING THE RELIABILITY OF A POWER DISTRIBUTION SYSTEM", filed Nov. 28, 2000, the entire disclosure of which is hereby incorporated by reference.

BACKGROUND

In a typical electrical distribution system, electrical energy is generated by an electrical supplier or utility company and distributed to consumers via a power distribution network. The power distribution network is the network of electrical distribution wires which link the electrical supplier to its consumers. Typically, electricity from a utility is fed from a primary substation over a distribution cable to several local substations. At the substations, the supply is transformed by distribution transformers from a relatively high voltage on the distributor cable to a lower voltage at which it is supplied to the end consumer. From the substations, the power is provided to industrial users over a distributed power network that supplies power to various loads. Such loads may include, for example, various power machines or computer/electronic equipment.

At the consumer's facility, there will typically be an intelligent electronic device ("IED"), such as an electrical energy/watt-hour meter, connected between the consumer and the power distribution network so as to measure quantities such as the consumer's electrical consumption or electrical demand. Such a meter may be owned by the consumer and used to monitor and control consumption and report costs or may be owned by the utility and used to monitor consumption and report revenue.

IED's include devices such as Programmable Logic Controllers ("PLC's"), Remote Terminal Unit ("RTU"), meters, protective relays and fault recorders. Such devices are widely available that make use of memory and microprocessors and have limited remote reporting capabilities. A PLC is a solid-state control system that has a user-programmable memory for storage of instructions to implement specific functions such as Input/output (I/O) control, logic, timing, counting, report generation, communication, arithmetic, and data file manipulation. A PLC consists of a central processor, input/output interface, and memory. A PLC is typically designed as an industrial control system. An exemplary PLC is the SLC 500 Series, manufactured by Allen-Bradley in Milwaukee, Wis.

A meter, is a device that records and measures electrical power consumption. Energy meters include, but are not limited to, electric watt-hour meters. In addition, meters are also capable of measuring and recording power events, power quality, current, voltages waveforms, harmonics, transients or other power disturbances. Revenue accurate meters ("revenue meter") are revenue accuracy electrical power metering devices which may include the ability to detect, monitor, or report, quantify and communicate power quality information about the power which they are metering. An exemplary revenue meter is model 8500, manufactured by Power Measurement Ltd, in Saanichton, B.C. Canada.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is type N and KC, manufactured by ABB in Raleigh, N.C.

A fault recorder is a device that records the waveform resulting from a fault in a line, such as a fault caused by a break in the line. An exemplary fault recorder is IDM, manufactured by Hathaway Corp in Littleton, Colo.

IED's can also be created from existing electromechanical meters or solid-state devices by the addition of a monitoring and control device which converts the mechanical rotation of the rotary counter into electrical pulses. An exemplary electromechanical meter is the AB1 Meter manufactured by ABB in Raleigh, N.C. Such conversion devices are known in the art.

In the early 1980's, the Computer Business Manufacturers Association (CBEMA), which is now the Information Technology Industry Council (ITIC), established a susceptibility profile curve to aid manufacturers in the design of power supply protection circuits. This power quality curve has since become a standard reference within the industry measuring all types of equipment and power systems and defines allowable disturbances that can exist on the power lines. Additionally, the semiconductor industry has established its own standard SEMI F47 curve for power quality, which is similar to the CBEMA curve but instead is focused on semiconductor power quality and associated supporting equipment.

In more recent years the electric utility marketplace has moved towards deregulation where utility consumers will be able to choose electrical service providers. Until now, substantially all end users purchased electric power they needed from the local utility serving their geographic area. Further, there was no way for utilities to guarantee the same reliability to all consumers from the utility because of different connection points to the transmission and distribution lines. With deregulation it is essential for consumers to be able to measure and quantify power reliability from their suppliers in order to ensure they are receiving the service they have opted for. Such service may involve various pricing plans, for example on volume, term commitments, peak and off-peak usage or reliability.

Power reliability is typically measured by several various indices. These indices include System Average Interruption Frequency Index ("SAIFI"), Customer Average Interruption Duration Index ("CAIDI"), System Average Interruption Duration Index ("SAIDI"), Average System Availability Index ("ASAI") and Momentary Average Interruption Duration Index ("MAIFI"). Each index provides a measure, in terms of ratios or percentages, of interruptions in delivery of electrical power, wherein an interruption may be classified as a complete loss of electrical power or where the quality of the delivered electrical power falls below or exceeds a pre-determined threshold. SAIFI measures the ratio of the total number of customer interruptions to the total number of customers served, hence the average. Lower averages signify better reliability. CAIDI measures the total customer hours interrupted to the total customer interruptions, in minutes. The lower the measure, the better the reliability.

SAIDI measures the ratio of customer hours interrupted to total customers served, in minutes. Again, the smaller the number the better the system. ASAI is a ratio of total number of customer hours the electric service has been turned on to the number of customer hours the service has been demanded. It is measured as a percentage and the higher the percentage, the better the reliability. The MAIFI measurement considers interruptions that last less than 5 minutes. System Average RMS Variation Frequency Index ("SARFI") is another power quality index that provides counts or rates of voltage sags, swells and/or interruptions for the system. There are two types of SARFI indices—SARFI_x and SARFI_curve.

SARFI_x corresponds to a count or rate of voltage sags, swells and/or interruptions below a threshold where SARFI_curve corresponds to a rate of voltage sags below an equipment compatibility curve, such as a CBEMA or SEMI curve. Mean Time Between Failure ("MTBF") is another measurement to indicate reliability. MTBF is usually expressed in hours and is calculated by dividing the total number of failures into the total number of operating hours observed. For example a device may specify MTBF as 300,000 hours. If this device operates 24 hours a day, 365 days a year it would take an average of 34 years before the device will fail.

Today's networked economy has demanded a fundamental change in the standards by which acceptable electric power reliability is measured. In modern high technology industries, where a power interruption or deviance of even a few milliseconds can cause significant problems and lost resources, a power reliability measurement with an increased resolution is needed. Further, in today's deregulated market, a standard reliability specification based on this higher resolution reliability measurement is needed. One such specification which standardizes higher resolution reliability measurement, involves a method of measuring reliability by the use of "nines", and is stated as a percentage of time the power is available and meeting a specified quality threshold.

A typical power distribution system, for example, provides "three nines" reliability, meaning the power is available 99.9% of the time. Fully reliable "high nines" power is becoming increasingly recognized as an essential element of business survival and the traditional reliability measurements on which the industry depends are no longer sufficient for today's technology as a measurement of downtime in minutes is no longer sufficient when only a few seconds, or even a few milliseconds, of downtime can result in large economic impact. CAIDI, SAIDI, ASAI and MAIFI do not allow a high enough resolution of time measurement for calculating reliability where events as short as 1 second may cause equipment downtime. Further, these traditional indices, are a function of aggregate loads and multiple locations, and do not provide the capability to measure reliability at single location. MTBF is usually related to a physical device, such as a generator, and not the power system attached to it and SARFI is measured in events, not in units of time. Many private corporations, such as Sure-Power Corporation, located in Danbury Conn., offer products such as the Sure Power System that guarantees high nines reliability. However, as technology becomes more integrated in our society a need for the consumer or utility to measure and monitor reliability coming from either the power distribution system, or a device such as the Sure Power System, is required.

Further, with the advent of electrical power deregulation, a standardized specification for power reliability is necessary to facilitate uniform comparison of suppliers. The above mentioned reliability measurements, because they necessarily measure different quantities, fail to provide such a uniform method of specifying reliability.

Therefore, in view of the above it is a primary object of the invention to provide an intelligent electronic device, more specifically an electricity measurement device, which provides more accurate reliability monitoring and more useful reliability reporting for consumers operating devices requiring high power reliability.

SUMMARY

The present invention is defined by the following claims, and nothing in this section should be taken as a limitation on those claims. By way of introduction, the preferred embodiments described below relate to an intelligent electronic device ("IED") capable of measuring and reporting the reliability of an electrical power distribution network. The IED comprises a first interface operative to couple the IED with an electrical power distribution network and a measurement component coupled with the first interface. The measurement component is operative to measure one or more parameters of the electrical power distribution network, including disturbance time, total system downtime and total system runtime. The IED further includes a reliability processor coupled with the measurement component and operative to receive the one or more parameters and compute a reliability value of the electrical power distribution network as a closest integer value to $$\left| \log_{10}\left( \frac{\text{Disturbance Time} + \text{Total System Downtime}}{\text{Total System Runtime}} \right) \right|.$$

The IED also includes a reporting module coupled with the reliability processor and operative to receive the reliability value and report the reliability value as an indication of the reliability of the power distribution network.

The preferred embodiments further relate to a method for use with an intelligent electronic device ("IED") coupled with an electrical power distribution network to measure and report the reliability of the electrical power distribution network. The method comprises: measuring one or more parameters of the electrical power distribution network, the one or more parameters including disturbance time, total system downtime and total system runtime; computing a reliability value of the electrical power distribution network as a closest integer value to $$\left| \log_{10}\left( \frac{\text{Disturbance Time} + \text{Total System Downtime}}{\text{Total System Runtime}} \right) \right|;$$

and reporting the reliability value as an indication of the reliability of the power distribution network.

Further aspects and advantages of the invention are discussed below in conjunction with the preferred embodiments.

BRIEF DESCRIPTION OF THE DRAWINGS

FIG. 3c illustrates a preferred embodiment of multiple IED's connected to multiple loads.

FIG. 4 illustrates an alternate embodiment for benchmarking the module against previously determined nines.

DETAILED DESCRIPTION OF THE PRESENTLY PREFERRED EMBODIMENTS

Figure 1:
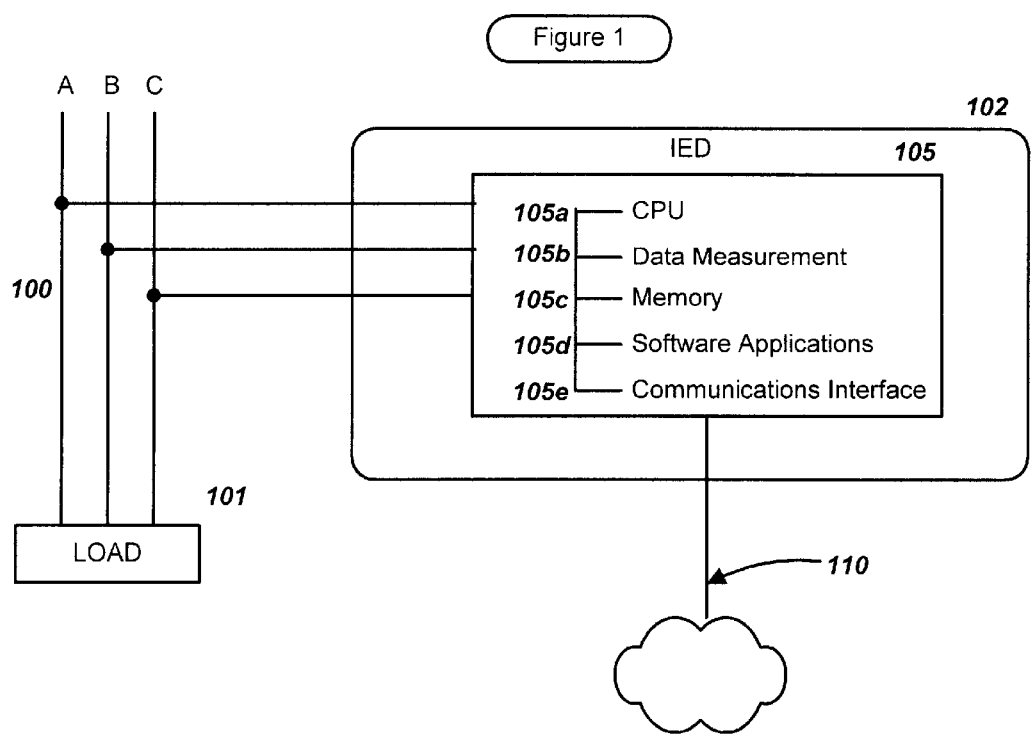
FIG. 1 illustrates a preferred embodiment of a physical layout using an IED of the present invention.

Many consumers and their associated power equipment require high reliability of power to ensure production, and minimize downtime of sensitive equipment that requires clean, stable and reliable power. Further, such consumers require a standardized specification for power reliability to effectively manage their consumption in a deregulated market. Reliability is closely related to the level of power quality required for the specific equipment to remain in operation during disturbances. This includes total power outages as well as sags, swells or other disturbances which deviate from pre-defined tolerances. Power reliability can be affected by several factors such as surges induced by devices started on the power grid or various weather-induced interruptions. One method of measuring reliability involves the use of "nines". Power reliability is established as a percentage of total system downtime versus total uptime. The numerical percentage is then decomposed to its digits, wherein each "9" represents an order of magnitude reduction of the probability of failure. The increasing need for substantially improved power quality and reliability that measures in the "high-9's", is being driven by the digital, info-centric economy. Such niche markets serve as a disruptive force to the traditional power industry, and may well become mainstream markets.

The number of nines can be calculated in one of the following ways:

$$\text{Reliability \%} = \frac{\text{Total System Runtime} - \text{Total System Downtime}}{\text{Total System Runtime}} \times 100$$

$$\text{Reliability \%} = \frac{\text{Total System Available Time}}{\text{Total System Runtime}} \times 100$$

Where the actual number of consecutive 9's starting with the most significant digit in the resultant numeric percentage measured are counted up and equals the "number of nines" measurement. The total system downtime, total system available time, total elapsed time and total system runtime are measured in terms of time. The unit of time, i.e. the resolution, varies depending on the number of nines, i.e. the level of reliability, being measured. For instance a small number of nines could employ a measurement of time in minutes where a high number of nines may require time to be measured in milliseconds. In an alternate embodiment the total system downtime, total system available time, total elapsed time and total system runtime are measured in cycles, or parts thereof, of AC voltage waveform. Total system runtime can be a running computation, that starts when the IED is first powered up, or when the power system is first turned on, or total system runtime may be operated on a sliding window basis over a day, week, month or other time period. Total system downtime can also include qualifications that allow a user to change what downtime may be considered at, such as a power outage of a certain time interval or a voltage spike of at least a certain RMS value.

Examples of total system runtime and downtime are given in more detail below. In the preferred embodiment, system downtime and system runtime are measured with a resolution of milliseconds and are computed as a running value when the IED is first powered on. It is preferred that the computation and reliability measures be stored in a non-volatile memory within the IED so that subsequent operating power interruptions do not reset the measure. A reset function may be provided. It will be appreciated that downtime and runtime can be measured with a high resolution and that the resultant percentage can be rounded or truncated prior to computing the nines measure so as to provide a standardized result.

Some residential consumers may have 99% reliability, or "Two Nines" which translates into 3.65 days of outage per year, computed as total system downtime of 3.65 days divided by total system runtime of 365 days. For this residential user there typically is no need to measure reliability in terms of 9's. A typical residential consumer has three Nines, or 99.9% reliability, which translates to approximately 8.7 hours of outage per year, computed as total system downtime of 8.76 hours divided by total system runtime of 8760 hours. Other consumers, such as phone companies, hospitals or airports, require better than Three Nines and may employ stand-by generator systems if only Three Nines reliability is available. Four Nines translates into just under 1 hour of downtime per year, computed as total system downtime of 52.56 minutes divided by total system runtime of 526500 minutes, where Five Nines translates into minutes of down time, computed as total system downtime of 5.256 minutes divided by total system runtime of 526500 minutes, which may still be unacceptable to any company working 24 hours, 365 days of the year. The electricity infrastructure needed for the new digital information society used by the telecom and dot-com world starts at Six Nines, or 99.9999% up time which translates to a maximum of 31 seconds of outage per year, computed as total system downtime of 31.536 seconds divided by total system runtime of 31536000 seconds. Seven Nines, or several seconds of disruption per year, computed as total system downtime of 3.1536 seconds divided by total system runtime of 31566000 seconds, protects against minor disturbances on power lines that may cause network crashing events but the Eighth Nine, or 99.99999%, computed as total system downtime of 315.4 milliseconds divided by total system runtime of 31536000000 milliseconds, measures interruptions in the hundreds of milliseconds that may crash the most delicate of equipment. These examples assume a 1 year duration of measurement, although longer or shorter windows of time may be used as is discussed below. As can be seen, the number of 9's specified directly translates into a reliable and standardized measure of the expected failure rate of the power distribution system.

While it is advantageous to have the highest Nine's possible, increasing power distribution system reliability is expensive, with the supplier's costs and committed resources increasing exponentially for each additional Nine added. For example, for every Nine after the standard 99.9% reliability, costs can rise from 200 to 1000% to reach Six Nines. Some utilities offer a particular number of 9's plus an 8, such as 99.99976%, stating that they don't quite have enough reliability to offer, for example, Six Nines, but offer much better than Five Nines.

Electricity with high nines, allows devices, such as web hosting centers, collection centers, ISP's, corporate data centers and other major financial, commercial and industrial facilities to substantially increase uptime, thereby raising revenues and decreasing cost. For businesses relying on data centers or e-business sites, clean, stable and reliable power for critical devices is paramount to ensure that costly breakdowns which result in immediate lost revenue do not occur.

Typically, for lower Nines, the utility or consumer defines an outage according to a standard which considers the level of susceptibility of their devices to shut down from a disturbance. For example a utility may consider an outage or disturbance if the voltage falls below 90% of the required RMS Voltage. For higher Nines, where the outage is of a smaller magnitude or duration, the measured voltage may be compared with a CBEMA or SEMI F47 curve to determine what is considered an outage. Disturbances include, surges, sags, swells, flicker, spikes, transients, line noise or complete disruptions. Additionally, other factors such as phase imbalance or voltage harmonics may have an effect on the reliability of the delivered electrical power and the devices that are supplied by it. For example, a utility measures the incoming power and measures a first surge of power 1 cycle in duration and 130% in magnitude of the normal RMS Voltage, and a second surge of power 0.02 of a cycle in duration and 135% in magnitude of the normal RMS Voltage. The utility applies this data to the CBEMA curve and determines the first surge to be unreliable power as it falls outside the curve, but deems the second surge to be reliable as it falls inside the curve.

In order to determine the reliability of an electrical power distribution network, or portion thereof, devices must be deployed to measure the desired parameters. Further, those measurements must be collected and the measure of reliability computed. Electric power meters are already deployed at the optimal locations for measuring power reliability as they are typically coupled between the power distribution system and the load which is supplied by the system. Unfortunately, there are no electric meters currently available which offer high accuracy power reliability measurement coupled with standardized reporting on the device. Accordingly, there is a need for an electricity meter that provides power reliability computation and monitoring, and permits viewing as a number of nines or percentages.

Referring now to FIG. 1, there is schematically illustrated how an IED 102 is coupled with an electrical power distribution system/network 100, which is further coupled with a load 101. One of ordinary skill in the art will recognize that the disclosed embodiments can also be coupled with a portion of the electrical power distribution network/system 100 to determine reliability of that portion only. Herein, the phrase "coupled with" is defined to mean directly connected to or indirectly connected with through one or more intermediate components. Such intermediate components may include both hardware and software based components. In the preferred embodiments, the IED 102 is an electric watt-hour revenue meter which primarily measures the consumption of electrical power by the load 101 from the distribution system 100. An exemplary revenue meter which can be used with the disclosed embodiment is the model 8500, manufactured by Power Measurement Ltd, in Saanichton, B.C. Canada. The reliability functionality described below is preferably implemented as an ION module created with the Pegasys development software, manufactured by Power Measurement Ltd, in Saanichton, B.C. Canada In the preferred embodiment the IED 102 is further coupled with a network 110 for communicating with other IED's 102 as well as data collection servers (not shown). The network 110 can be a private or public intranet, an extranet or combinations thereof, including a virtual private network coupling multiple intranets or extranets together via the Internet. In addition to measuring power consumption, the IED 102 includes device circuitry 105 which monitors the reliability and/or quality of the electrical power delivered to the load 101 by the power distribution system 100. The device circuitry 105 includes the internal hardware and software of the device, such as the CPU, memory, firmware and software applications, data measurement functions and other programmed features.

Figure 2A:
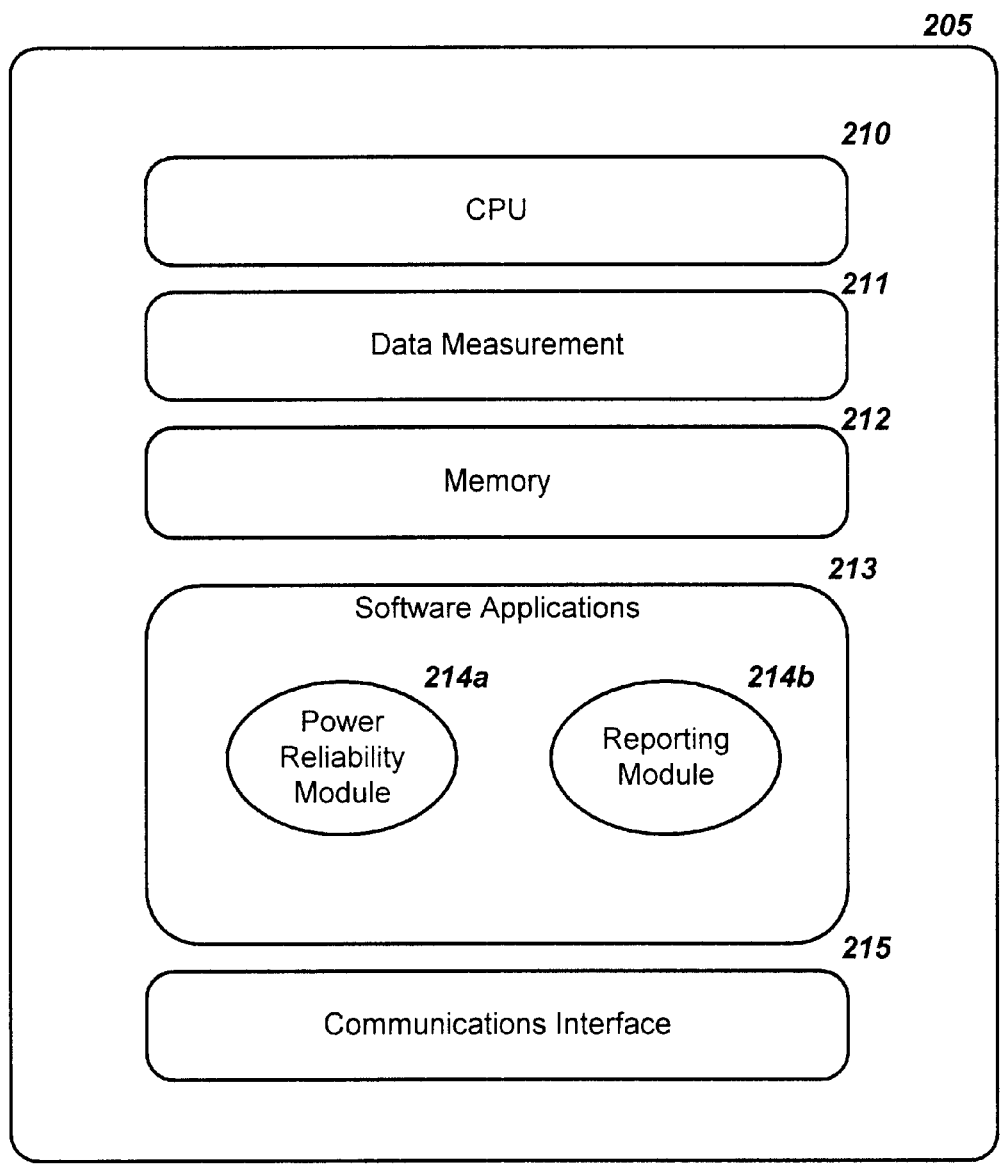
FIG. 2a illustrates a preferred embodiment of the device circuitry of an IED.

FIG. 2a illustrates the preferred embodiment where the device circuitry 205 includes Software Applications 213 which further includes a power reliability module 214a which computes and measures the reliability of the power, or number of nine's, and a reporting module 214b which compiles and reports the reliability data for the user. In a preferred embodiment, these modules 214a 214b are implemented in software. In alternative embodiments, the modules 214a 214b are implemented in hardware or a combination or hardware and software.

Figure 2B:
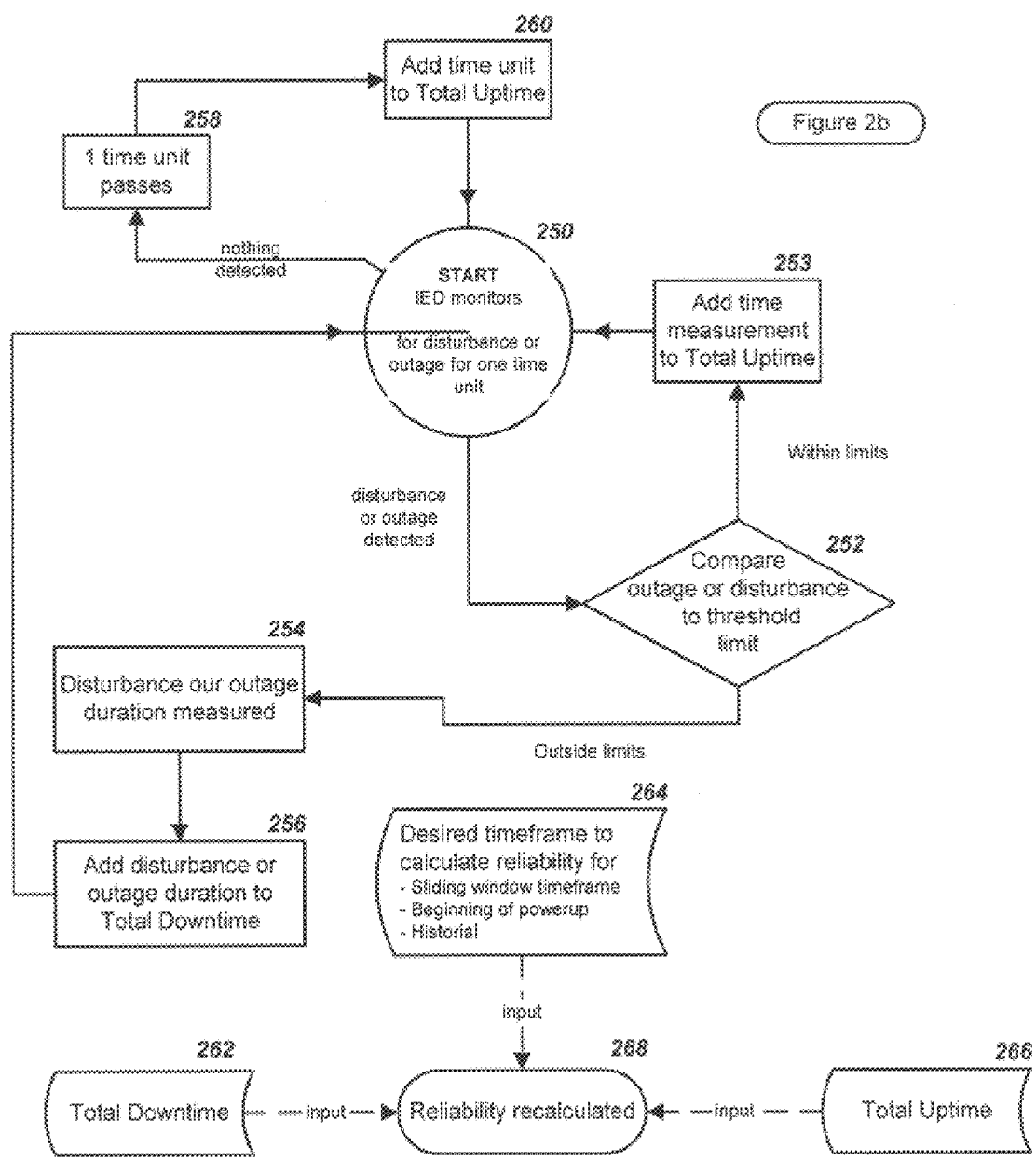
FIG. 2b illustrates a preferred embodiment for calculating reliability.

FIG. 2b illustrates the preferred embodiment's reliability calculation as implemented in the reliability module 214a. As described above, this functionality is implemented as an ION software module executing on the IED. An IED 102 monitors the power lines for a disturbance or power outage 250 for one time unit. In the preferred embodiment where high nines of reliability is measured, such as 7 or 8 nines, a time unit is one millisecond. However for lower resolution in calculating nines, such as 4 or 5 nines, a larger time unit, such as seconds, may be used. In an alternate embodiment the preferred unit of time is measured as the time taken for a ½ cycle of power. If no disturbance is detected 258 in that time unit one time unit is added to the Total Uptime 260 value. If a disturbance is detected it is compared against the threshold limit to determine if it should be considered as an outage 252 or within tolerable limits 253. For example, a user may consider an outage if a disturbance exceeds a certain voltage, or exceeds a certain length in time. Examples of disturbances are outlined in more detail below and in FIGS. 3a and 3b. If the disturbance is deemed to fall within the specified threshold or tolerance limits the time measured is added to the Total Uptime 253 and the IED continues to monitor for disturbances 250. If the disturbance is determined to fall outside the limits, the disturbance is timed 254 and the duration added to the Total Downtime 256. Determining whether the disturbance falls within or outside of the threshold limit is discussed in more detail in FIGS. 3a and 3b below. To compute reliability the module requires an input value of Total Uptime 266, Total Downtime 262 and desired timeframe 264. The desired timeframe may include calculating the reliability over a sliding window of time, from beginning of time to current time, or beginning of the IED or power system power-up to current time, or as a function of historical data. The outputs of the module comprises the number of nines or, alternatively, the actual computed percentage of reliability. In the preferred embodiment reliability is calculated in the following way:

$$\text{Reliability \%} = \frac{\text{Total Uptime} - \text{Disturbance Time}}{\text{Total Uptime} + \text{Offline Time}} \times 100$$

Offline Time is considered to be time where the IED 102 was not recording reliability. This occurs, for example, when an attached load is shut down for scheduled maintenance or the IED 102 is taken offline for re-configuration.

Figure 2C:
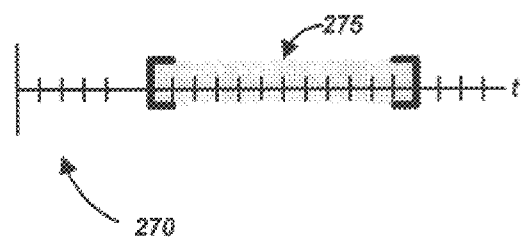
FIG. 2c illustrates a sliding time window for calculating reliability over a time period.

Referring to FIG. 2c, the reliability module 214a also includes a sliding window 275 of time over which the reliability is measured. For example, the IED 102 may be programmed to calculate reliability and issue a daily report to the user showing the reliability for the past 24 hours. A sliding window 275 of one day is placed on the timeline 270 and the reliability module 214*a* utilizes this window to measure the instantaneous reliability of the most recent 24 hour period.

Figure 3A:
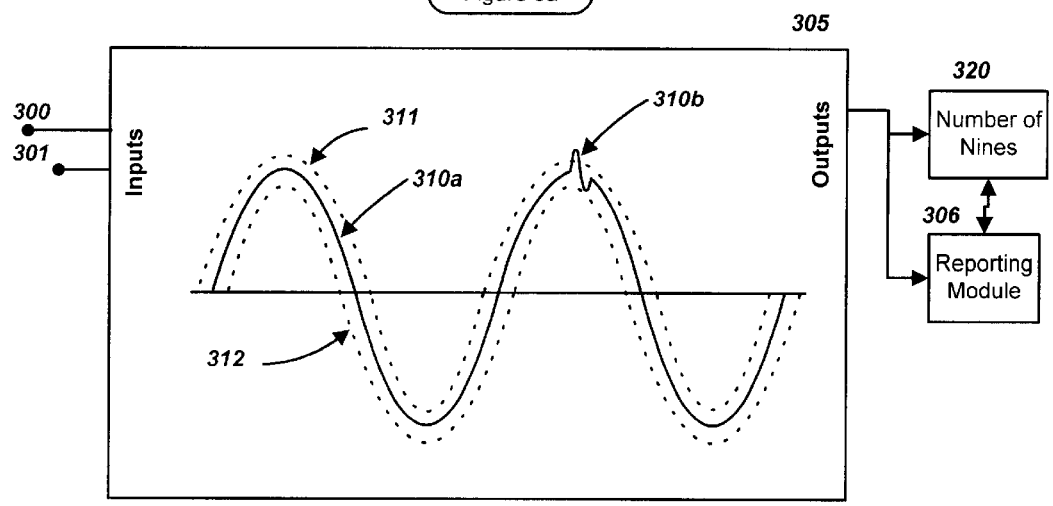
FIG. 3a illustrates an alternate preferred embodiment for calculating reliability.

FIG. 3*a* illustrates a preferred embodiment which determines if a disturbance falls within a specified tolerances for measuring reliability. In this preferred embodiment the IED 102 is an electric meter which senses the voltage and current in each phase of the connected electric circuit (not shown). The IED 102 circuitry includes a power reliability module 305 which monitors the waveforms of all of the voltage phases of the electric circuits for deviations beyond allowable limits. In one preferred embodiment, the allowable limits for high limit 311 is 110% and the low limit 312 is 90% of the full waveform 310*a*. When a disturbance or deviation is detected 310*b* the module 305 provides information about the entire disturbance, such as the time stamp, magnitude and duration. The module 305 is also capable of breaking up the disturbance into discrete components (sub-disturbances) for a more detailed analysis. More detailed information about modules can be found in U.S. Pat. No 5,650,936. Further, more detailed information regarding power quality measurement and reporting can be found in U.S. patent application Ser. No. 09/370,317, entitled "REVENUE METER WITH POWER QUALITY FEATURES", filed Aug. 9, 1999.

The duration of the disturbance beyond the allowable limits is then translated by the module 320 into a measure of the reliability. In this preferred embodiment the module 305 is coupled with a reporting module 306 which allows the user to view the number of nines measured over a specific time period, such as this week, month, quarter or year. Furthermore, this cumulative time period can be reset by the user. In the preferred embodiment a sliding window is utilized when calculating the reliability over the cumulative time period as set to the desired length of time by the user. Furthermore, users may instruct the IED 102 to measure downtime in terms of equipment downtime, not the actual power outage downtime. For example, an outage may last 20 seconds, however in that 20 seconds, devices which require up to 2 minutes to restart may be affected, thus the IED 102 may count the 2 minutes as the downtime. In an alternate embodiment, the IED contains ride-through capabilities where the IED maintains power for a period of time after the power supply from the power distribution system is disconnected. The reliability module further contains a detection module which determines if the power has been disconnected because the power distribution system is unavailable, or the IED user has powered down the IED but the power distribution line still is operable. This module enables the system downtime to be property calculated by determining if the power outage is due to an actual distribution outage, or the power outage is due to a user taking the IED offline. For example, if a user powers down an IED for maintenance, that downtime should not be considered as downtime, but rather added to the uptime, as the distribution grid was not inoperable. When the IED is reconnected to the distribution grid if the module detects the downtime was due to the distribution grid then the downtime is added to the total downtime, whereas if the module detects the downtime was due to a user taking the IED offline and the distribution grid was not affected, then the downtime is still to be considered as system runtime.

Figure 3B:
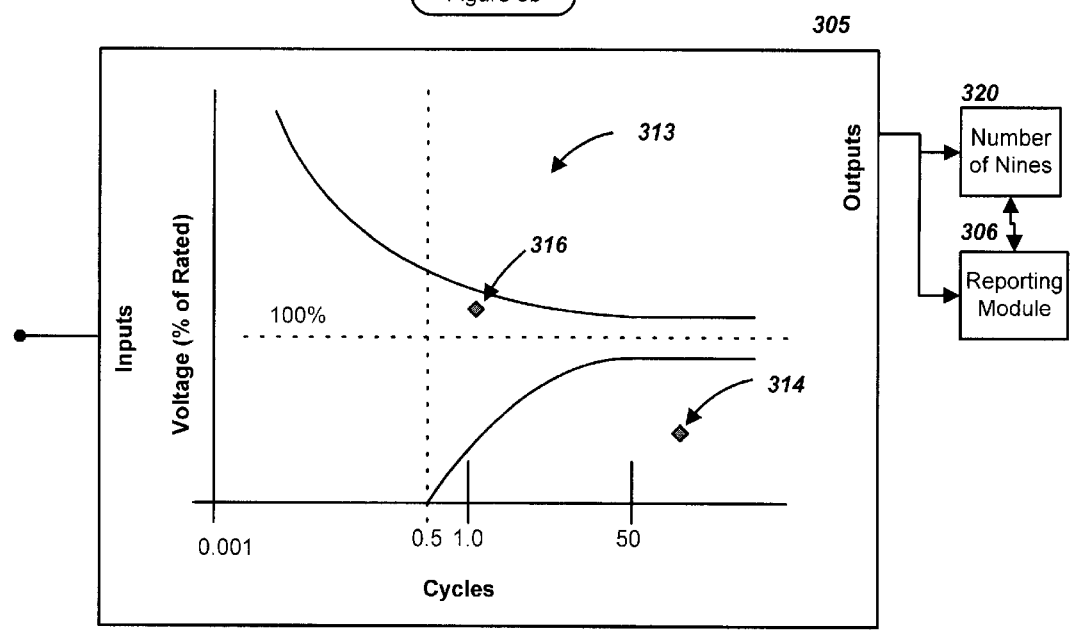
FIG. 3b illustrates an alternate preferred embodiment for calculating reliability.

FIG. 3*b* illustrates a second preferred embodiment for calculating nines using a CBEMA curve 312 or SEMI F47 curve (not shown) function in the module 305. In the embodiment, the module 305 contains software and hardware implemented functions which perform the specific functions. As above the IED 102 circuitry includes a power reliability module 305 which monitors the waveforms of all of the voltage phases of the electric circuits for deviations beyond allowable limits as applied to the pre-selected curve 313. When a disturbance or deviation is detected 314 the module 305 provides information about the entire disturbance, and converts this information into the measured number of nines. In the preferred embodiment a user may select a pre-defined curve, such as the curve 312, or program an alternate curve into the module 305 corresponding to the specific load the IED 102 is connected to. For example, the device circuitry 205 described in FIG. 2 is set to measure disturbances within a certain time interval, such as 1 millisecond. In the preferred embodiment the preferred time interval is measured in milliseconds, although alternative time intervals are contemplated. The device circuitry 205 timestamps the current time to a log on every time interval. When a disturbance is detected by the IED 102, the module 305 computes and plots the magnitude and duration of the voltage disturbance on the CBEMA curve 312 and then, through software algorithms, such as a Boolean pass/fail when plotted against the curve, determines if it falls outside or inside the curve, signifying either unreliable or reliable. If the disturbance is of some length, such as several minutes, such that it renders the device circuitry without power and prohibits it from functioning, the IED is preferably provided with hardware enabled software, such as a backup battery, that continues to monitor time and further instructs the device upon re-start-up to compare the actual monitored time to the last measured timestamp in the log. This allows the IED 102 the ability to compute reliability when the IED 102 is rendered inoperable due to an extended power failure.

Furthermore, in an alternate preferred embodiment, the power reliability module 305 logs into the reporting module 306 those disturbances 316 which do not fall outside of the allowable limits, but are in the near proximity to the pre-defined limits.

FIG. 3*c* illustrates a preferred embodiment having multiple IED's 350, 351, 352 connected to multiple loads 353, 353, 355. IED's 350, 351, 352, are connected to loads 353, 354, 355 on the power system 361. Further, IED 356 is provided to monitor the power system 361. In the preferred embodiment each IED 350, 351, 352, 356 contains a reporting and a power reliability module, as described above, and is connected via a network 362. The power reliability module 305, coupled with the reporting module 306, analyzes power and reports to the user at what rates of recurrence unreliable power occurs. In an alternative embodiment, IED's 350, 351, 352 report their reliability measurements from each of their branch circuits of power system 361 to IED 356 which computes a cumulative reliability measure for the entire system 361. The power reliability module and a description of the operation modes while connected to multiple IED's is discussed in more detail in U.S. Pat. application Ser. No. 09/723,564, "INTRA-DEVICE COMMUNICATIONS ARCHITECTURE FOR MANAGING ELECTRICAL POWER DISTRIBUTION AND CONSUMPTION", filed Nov. 28, 2000, which is incorporated by reference herein.

FIG. 4 illustrates an alternate embodiment for benchmarking the module against a previously determined nines reliability measure. In operation an IED 402 is connected to a power system 400 of known reliability. The power reliability module is then calibrated to measure the appropriate number of nines. Alternately, the IED 402 is connected to a power system 400 of unknown reliability and the power reliability module gives the user the reliability, or number of nines, at that location.

In another alternate embodiment the IED 402 is connected to a power system of 400 where it measures reliability for a specified period of time. From this data, a historical baseline of reliability is created. For example an IED 402 is connected to the power system 400 where it measures 99.999% reliability over a one month period. The IED then changes from benchmarking mode to analyze mode where 5 nines' reliability is set as the benchmark at that location. If the reliability drops below or above 5 nines an alarm is given to the user notifying them of a change in measured reliability. Further, the user views both the reliability, in number of nines, such as 99.9999% and in actual percentage, such as 99.9994687%. In another preferred embodiment, the power reliability module in the IED contains a historical reporting function which allows analyzing of historical disturbances to give the historical nines measure. This function is useful for analyzing various power vendors historical data to determine reliability. This function further allows a user to analyze historical data and return the power reliability measurement for various tolerance input values. For example, a consumer be may required to determine what %RMS tolerance values, such as a low and high tolerance limit, which are to be specified in order to pass as a certain number of nines reliability. Further, the user can re-compute the reliability measure with different thresholds for what constitutes an outage. For example, the user can compute reliability of the power system to deliver voltage within 99% RMS and then re-compute the reliability of the power system to deliver voltage within 90% RMS.

In addition to the aforementioned calculations, the number of nines can be calculated in the following way:

$$\text{Reliability \%} = \frac{\text{Total System Downtime} - \text{Disturbance Time}}{\text{Total System Uptime} + \text{Total System Downtime}}$$

where Total System Runtime =Total System Uptime +Total System Downtime

Rearranging one gets the following equation:

$$\text{Reliability \%} = \left(1 - \frac{\text{Disturbance Time} + \text{Total System Downtime}}{\text{Total System Runtime}}\right) \times 100$$

Where the total system runtime, disturbance time and total system downtime are measured in terms of time. For high resolution, i.e., measuring small units of time, where the total system runtime value becomes large, such as many millions of seconds, and the disturbance time or system downtime becomes small, i.e., several seconds or even milliseconds, this calculation can incur floating point calculation problems.

These problems occur due to the limitations of single precision floating point mathematics utilized by many digital microprocessors. Single precision refers to the number of bits used to store the fractional or exponential portion of a floating point number as the processor performs requisite mathematical computations. Utilizing more bits allows more precise fractional quantities and a higher range of magnitudes to be represented and accurately manipulated by the processor. The number of bits used is a function of the microprocessor chosen to perform the floating point computations. In the preferred embodiment, a Motorola 68XXX compatible processor is used such as the 68040, manufactured by Motorola Corporation, located in Schaumburg, Ill. The 68XXX processor offers single precision floating point computation using 32 bits to represent the fractional/exponential portion. Unfortunately, 32 bit single precision floating point representations fail to accurately represent fractional amounts greater than seven decimal digits. While this is not an issue for reliability computations measured over short windows of time or with low resolution, as noted above, errors can occur as the time window or resolution with which reliability is measured increases.

One solution to this problem is to switch to double precision floating point numbers. Double precision effectively doubles the number of bits utilized to represent the exponential portion of the floating point number. Unfortunately, such solutions require design and manufacturing changes which can significantly increase costs. In addition, floating point computations are highly processor intensive and often require special hardware (i.e. floating point units or co-processors) to implement within the processor. Increasing the precision of the floating point computations increases the processing time and memory requirements of such computations and may introduce reliability issues due to the introduction of additional logic.

In an alternate embodiment where high reliability is required over a long time period, such as a month, the number of nines is calculated in the following way using 32 bit single precision floating point representations:

$$Z = \left|\log_{10}\left(\frac{\text{Disturbance Time} + \text{Total System Downtime}}{\text{Total System Runtime}}\right)\right|$$

Number of Nines =FLOOR(Z)

Where FLOOR is a calculation that returns the closest integer value that is less than or equal to the value Z. The value Z will be a mixed number, for example 5.7346, of which the integer portion represents the number of 9's which would constitute the reliability percentage computed with the same inputs. Thus, the result of the Floor function and therefore the number of 9's is equal to 5 for the exemplary value of Z. Additionally, the value of an "8",can be derived from remainder of the mixed number, i.e., 0.7346. As described earlier, the value of an 8 can be used to signify a reliability that is close to a 9. For example, some utilities offer a particular number of 9's plus an 8, such as 99.99976%, stating that they don't quite have enough reliability to offer, for example, Six Nines, but offer much better than Five Nines.

For example, where the Total System Runtime is equal to 30 days (2,592,000 s) and a measured Disturbance Time is 2 ms over the 30 days and the Total System Downtime is 1 s over the 30 days, the value of Z is calculated as:

$$Z = \left|\log_{10}\left(\frac{2ms + 1s}{30d}\right)\right| = 6.412767$$

and thus the number of nines is equal to 6. This can be seen by computing the reliability percentage as:

$$\text{Reliability \%} = \left(1 - \frac{.002s + 1s}{2,592,000s}\right) \times 100$$

This equals 99.9999614% or six 9's.

It is therefore intended that the foregoing detailed description be regarded as illustrative rather than limiting, and that it be understood that it is the following claims, including all equivalents, that are intended to define the spirit and scope of this invention.

We claim:

1. An intelligent electronic device ("IED") comprising:
   a first interface operative to couple said IED with an electrical power distribution network;
   a measurement component coupled with said first interface and operative to measure one or more parameters of said electrical power distribution network, said one or more parameters including disturbance time, total system downtime and total system runtime;
   a reliability processor coupled with said measurement component and operative to receive said one or more parameters and compute a reliability value of said electrical power distribution network as a closest integer value to $$\left|\log_{10}\left(\frac{\text{Disturbance Time} + \text{Total System Downtime}}{\text{Total System Runtime}}\right)\right|;$$

and
   a reporting module coupled with said reliability processor and operative to receive said reliability value and report said reliability value as an indication of the reliability of said power distribution network.

2. The intelligent electronic device of claim 1, wherein said intelligent electronic device comprises a revenue meter.

3. The intelligent electronic device of claim 1, wherein said reliability value is computed as a function of an elapse of time.

4. The intelligent electronic device of claim 3, wherein said elapse of time is measured in milliseconds.

5. The intelligent electronic device of claim 3, wherein said elapse of time is measured as at least ½ cycle of power on said electrical power distribution network.

6. The intelligent electronic device of claim 3, wherein said elapse of time comprises a sliding window of time.

7. The intelligent electronic device of claim 6, wherein sliding window of time comprises 1 year.

8. The intelligent electronic device of claim 1, further comprising a second interface operative to couple said IED with a communications network, said reporting module coupled with said second interface and further operative to report said reliability value over said communications network.

9. The intelligent electronic device of claim 1, wherein said one or more parameters comprise one or more disturbances in said electrical power distribution network.

10. The intelligent electronic device of claim 1, wherein said reliability processor is further operative to compute said reliability value for a period time, said period of time including a portion of time when said IED is without power.

11. The intelligent electronic device of claim 1, wherein said IED comprises a relay.

12. The intelligent electronic device of claim 1, wherein said LED comprises a fault recorder.

13. The intelligent electronic device of claim 1, wherein said IED comprises a Remote Terminal Unit ("RTU").

14. The intelligent electronic device of claim 1, wherein said IED comprises a Programmable Logic Controller ("PLC").

15. The intelligent electronic device of claim 1, wherein said reliability processor is further coupled with a backup battery.

16. In an intelligent electronic device ("IED") coupled with an electrical power distribution network, a method of reporting the reliability of said electrical power distribution network, the method comprising:

(a) measuring one or more parameters of said electrical power distribution network, said one or more parameters including disturbance time, total system downtime and total system runtime;
   (b) computing a reliability value of said electrical power distribution network as a closest integer value to $$\left|\log_{10}\left(\frac{\text{Disturbance Time} + \text{Total System Downtime}}{\text{Total System Runtime}}\right)\right|;$$

and
   (c) reporting said reliability value as an indication of the reliability of said power distribution network.

17. The method of claim 16, wherein said IED comprises a revenue meter.

18. The method of claim 16, wherein said computing further comprises computing said reliability value as a function of an elapse of time.

19. The method of claim 18, wherein said elapse of time is measured in milliseconds.

20. The method of claim 18, wherein said elapse of time is measured as at least ½ cycle of power on said electrical power distribution network.

21. The method of claim 18, wherein said elapse of time comprises a sliding window of time.

22. The method of claim 21, wherein sliding window of time comprises 1 year

23. The method of claim 16, wherein (c) further comprises reporting said reliability value over a communications network coupled with said IED.

24. The method of claim 16, wherein (b) further comprises computing said reliability value for a period time, said period of time including a portion of time when said IED is without power.

25. The method of claim 16, wherein said IED comprises a relay.

26. The method of claim 16, wherein said IED comprises a fault recorder.

27. The method of claim 16, wherein said IED comprises a Remote Terminal Unit ("RTU").

28. The method of claim 16, wherein said IED comprises a Programmable Logic Controller ("PLC").

29. The method of claim 16, wherein said IED is further coupled with a backup battery.

30. An electrical watt-hour meter comprising:
   a first interface operative to couple said meter with an electrical power distribution network;
   a measurement component coupled with said first interface and operative to measure one or more parameters of said electrical power distribution network, said one or more parameters including disturbance time, total system downtime and total system runtime;
   a reliability processor coupled with said measurement component and operative to receive said one or more parameters and compute a reliability of said electrical power distribution network as a percentage according to the formula $$\text{Reliability \%} = \left(1 - \frac{\text{Disturbance Time} + \text{Total System Downtime}}{\text{Total System Runtime}}\right) \times 100;$$

and
   a reporting module coupled with said reliability processor and a display and operative to receive said percentage and report said reliability as a percentage on said display and further operative to report said reliability as the number of continuous digits which are equal to the number 9 constituting said percentage, starting from the most significant digit.

31. The electric watt-hour meter of claim 30, wherein said reliability processor is further coupled with a backup battery.

* * * * *

UNITED STATES PATENT AND TRADEMARK OFFICE
CERTIFICATE OF CORRECTION

PATENT NO.   : 6,611,773 B2
DATED        : August 26, 2003
INVENTOR(S)  : Piotr B. Przydatek et al.

It is certified that error appears in the above-identified patent and that said Letters Patent is hereby corrected as shown below:

Column 13,
Line 2, delete "LED" and substitute -- IED -- in its place.

Signed and Sealed this

Sixth Day of July, 2004

JON W. DUDAS
*Acting Director of the United States Patent and Trademark Office*